United States Patent [19]

Koriyama

[11] Patent Number: 5,666,933
[45] Date of Patent: Sep. 16, 1997

[54] SLEEVELESS CYLINDER BLOCK WITHOUT MARGINAL PLATING COATING

[75] Inventor: Masao Koriyama, Iwata, Japan

[73] Assignee: Yamaha Hatsudoki Kabushiki Kaisha, Shizuoka, Japan

[21] Appl. No.: 406,691

[22] Filed: Mar. 20, 1995

[30] Foreign Application Priority Data

Mar. 18, 1994 [JP] Japan .................................. 6-074317

[51] Int. Cl.$^6$ ........................................................ F02F 1/00
[52] U.S. Cl. ........................................ 123/668; 123/193.2
[58] Field of Search .................................. 123/668, 669, 123/193.2, 193.3, 657; 29/888.06, 888.061

[56] References Cited

U.S. PATENT DOCUMENTS

| | | | |
|---|---|---|---|
| 2,914,048 | 11/1959 | Phillip | 123/668 |
| 3,932,228 | 1/1976 | Sugiyama et al. | 123/193.2 |
| 4,398,527 | 8/1983 | Rynbrandt | 123/668 |
| 4,614,185 | 9/1986 | Fox | 123/193.2 |
| 4,757,790 | 7/1988 | Ushio et al. | 123/668 |
| 5,131,356 | 7/1992 | Sick et al. | 123/668 |
| 5,211,153 | 5/1993 | Yonekawa et al. | 123/668 |
| 5,315,970 | 5/1994 | Rao et al. | 123/668 |

FOREIGN PATENT DOCUMENTS

| | | | |
|---|---|---|---|
| 4634477 | 3/1954 | Belgium . | |
| 3438666 | 5/1985 | Germany | 123/668 |
| 4238525 | 11/1993 | Germany . | |
| 0001448 | 1/1980 | Japan | 123/668 |
| 524036 | 7/1940 | United Kingdom . | |

OTHER PUBLICATIONS

European Search Report dated Jun. 15, 1995.

*Primary Examiner*—Marguerite McMahon
*Attorney, Agent, or Firm*—Knobbe, Martens, Olson & Bear

[57] ABSTRACT

A sleeveless cylinder block for an automobile engine, motorcycle engine or the like having at least one cylinder such as that made of an aluminum ally, the inside surface of which is plated, is characterized in that a marginal portion from the bottom end of the inside surface of the cylinder on the side of the cylinder skirt and the remaining part of the cylinder block lower than the marginal portion are not plated, whereby only a target area inside the cylinder is securely plated, and further the area between the bottom of the cylinder and the cylinder skirt is strengthened.

6 Claims, 10 Drawing Sheets

SLEEVELESS CYLINDER BLOCK WITHOUT MARGINAL PLATING COATING

BACKGROUND

1. Field of the Invention

This invention relates to a sleeveless cylinder block for vehicle engines, which cylinder block does not have a sleeve inserted but has a plated inner cylinder wall, and in particular, to such a sleeveless cylinder block having a plating coating deposited only and securely on the necessary portion, and having an unplated portion at the bottom of the inner wall.

2. Background of the Art

Light weight aluminum alloys have been used in the cylinder heads and cylinder blocks of vehicle engines in order to reduce their weight, but aluminum alloys do not have sufficient resistance to friction abrasion occurring on the inside surface of the cylinders upon which the pistons slide. Thus, cast iron sleeves (liners) are generally installed to make the sliding surface more resistant to abrasion. However, since cast iron sleeve inserts are heavy, efforts to make engines, especially multicylinder engines, more compact and lighter have been focused on the approach of directly increasing the abrasion resistance of the inside surface of the cylinders made of aluminum alloys by plating the inside surface with chrome or nickel, as an alternative to inserting cylinder sleeves. As above, despite the fact that plating needs to be performed on the inside surface of a cylinder, the structures of cylinders for vehicle engines are not designed for plating, and thus plating localized on the inside surface of the cylinder raises complications in many cases. For example, internal combustion cylinders made of aluminum alloys for automobile engines are integrated with cylinder skirts which are further integrated with upper crankshaft bearing portions mounted on and between the cylinders at the bottom of the cylinders, and therefore controlling a plated area is difficult.

Conventionally conducted plating treatments are immersing methods in which a cylinder and an electrode are immersed in a plating liquid which is stored in a tank, and a voltage is impressed therebetween. However, based on the immersing methods, it is difficult to locally plate the cylinder, and parts such as the outside of the cylinder and the inside surface of the cylinder skirt which it is not necessary to plate are also inevitably plated. Further, in immersing methods, the plating speed is impractically slow, and plating productivity is very low. In order to improve productivity of the common plating treatment, a technology to speed up plating processes by impressing a voltage between the inner surface of a cylinder to be plated and an electrode while permitting a plating liquid to flow therebetween has been recently developed. However, even if the flowing liquid plating method is adopted, local plating is not necessarily achieved since it is not easy to control the plating liquid flow as desired. An attempt to plate the inside surface of a cylinder using a flowing liquid plating method concerns the plating liquid flow which takes place only inside the cylinder in which a cover (seal) for sealing plating liquid is placed near the bottom of the cylinder in the cylinder skirt (Japanese Patent Application Laid-open No. 5-222589 (1993). A balloon type seal placed over the bottom of the cylinder in the cylinder skirt can be adapted to seal plating liquid (Japanese Patent Application Laid-open No. 4-333594 (1992)).

However, the above methods involve several problems. That is, when the bottom of a cylinder is not flat, i.e., some portions integrated with the cylinder at the bottom of the cylinder in connection with a crankshaft, it is impossible to fit the seal over the bottom of the cylinder to seal plating liquid at the bottom of the cylinder, and thus a seal must be placed somewhere inside the cylinder skirt, meaning that the portions for a crankshaft will also be plated. Even though there is no obstacle at the bottom of the cylinder so that a seal can placed over the bottom, a plating coating is formed all the way down the bottom of the cylinder and over the brim. The edges of a plating coating are quite fragile in any case, so that when the bottom edge of the cylinder or the portion for a crankshaft undergo mechanical treatment such as mechanical grinding, the plating edge may be cracked, and the cracks may spread into the other pads of the plating coating.

In addition, the above seals placed over the bottom of the cylinder may not be sufficiently secured when used in a high speed plating method in which the speed of plating liquid flow is 1-6 m/sec which improves productivity. If sealing is not complete, the plating liquid will leak through the incomplete pad of the seal, resulting in disturbing the quality control, plating unnecessary pads, and causing hazards in operation. However, since, in the aluminum alloy sleeveless cylinder blocks of the prior art, the cylinder skid, formed below the lower pad of the cylinder, starts approximately at the lower end of the piston, a sealing jig cannot be disposed on any place other than over the bottom of the cylinder in order to plate the inside of the cylinder, and the aforesaid drawbacks cannot be eliminated. In addition, the area between the bottom of the cylinder and the cylinder skirt is relatively weak as compared with the plated area, and thus noise from operation of the engine is readily generated.

SUMMARY OF THE INVENTION

The present invention has exploited a cylinder block suitable for a high speed plating system, which has at least one cylinder in which only a target area is securely plated. An objective of the present invention is to resolve the above described problems in sleeveless cylinder blocks associated with their structures of the prior art irrespective of whether or not a cylinder skirt and a crankshaft bearing portion are integrated with a cylinder in the cylinder blocks, especially having a high quality plating coating formed by a high speed plating system, by providing an adequate inside-cylinder sealing area to securely plate only a target area, which sealing area comes into contact with the sealing jig during the plating of the inside surface of the cylinders, and further contributes to reduction of the noise during engine operation due to an increase in strength of the area contiguous with the skid at the lower end of the cylinder.

Namely, one important aspect of the present invention is a sleeveless cylinder block having at least one cylinder, the inside surface of said cylinder being plated, wherein a marginal portion from the bottom end of the inside surface of said cylinder on the side of a cylinder skirt and the remaining part of the cylinder block lower than said portion are not plated, said portion having a width sufficient to seal plating liquid with a sealing jig contacting said portion during plating treatment. By providing an adequate space inside the cylinder for the contact surface of the sealing jig used during the plating operation, sealing is secured even when plated by a high speed plating system, thereby plating only a target area inside the cylinder, so that any hazard in operation due to leaks of plating liquid, and deterioration of the plating coating due to cracks initiated at the edges of an unnecessary plating coating by grinding treatment can entirely be eliminated.

The cylinder block of the present invention can be adapted for any cylinder in which a piston slides, such as those of internal combustion engines e.g., automobile engines, motorcycle engines and lawn mower engines, and reciprocating compressors. However, the most beneficial embodiment of the present invention is a sleeveless cylinder block for vehicle engines, especially for automobile engines having a cylinder block in which the cylinder is integrated with a cylinder skirt. In the above cylinder block, when the unplated marginal portion on the inside surface is provided below the lower dead point position of the lower end of a piston which slides on the inside surface of the cylinder, the sliding of the piston on the inside surface of the cylinder can remain excellent in lubricity and frictional properties. If the unplated marginal portion on the inside surface is constructed by extending the inside surface downward so as to form a transitional wall between the cylinder and the cylinder skirt, the area between the cylinder and the cylinder skirt can be strengthened, thereby reducing noise during engine operation. Alternatively, if the unplated marginal portion on the inside surface is constructed by extending the inside surface upward so as to provide said unplated marginal portion at the bottom end of the cylinder, the cylinder block can easily be constructed without affecting other structures such as the structure of crankshaft bearing portions.

According to the above cylinder block, since the contact surface for a sealing jig is provided inside the cylinder, although the cylinder block further comprise upper crankshaft bearing portions integrally formed at the bottom of the cylinder, sealing can remain secured. The upper crankshaft bearing portions projects inward with respect to the inside surface of the cylinder, and the projecting part contacting the bottom of the cylinder is reduced along the inside surface of the cylinder to a point deeply enough to place a sealing jig at the bottom of the cylinder. In this structure, the positioning of the sealing jig is greatly simplified and secured. In many cases, the sleeveless cylinder block of the present invention is made of an aluminum alloy, although other alloys or even plastic can be used. The plating of the cylinder block of the present invention is preferably conducted by a high speed plating system, and the plating on the inside surface of the cylinder is preferably a nickel-based composite plating containing a dispersed silicon carbide and phosphorus. In that case, the cylinder block can be provided with the plating coating having excellent lubricity, frictional properties and hardness.

DETAILED DESCRIPTION OF THE PREFERRED EMBODIMENT

Figure 1:
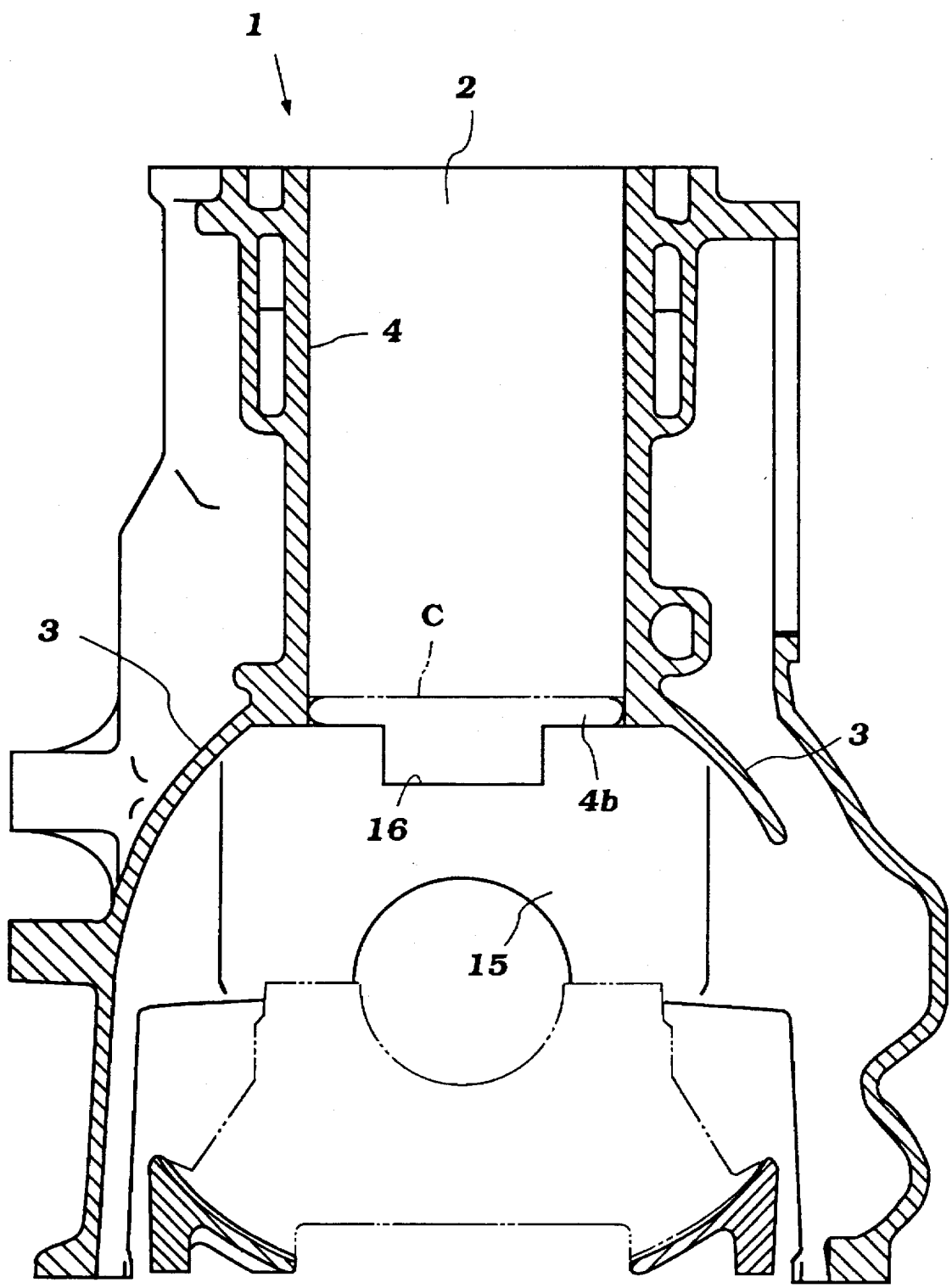
FIG. 1 is a vertical cross-sectional schematic view perpendicular to a crankshaft (not shown) illustrating one embodiment of a sleeveless cylinder block of the present invention.

The sleeveless cylinder block of the present invention has at least one cylinder, the inside surface of which is plated, wherein a marginal portion from the bottom end of the inside surface of said cylinder on the side of the cylinder skirt and the remaining part of the cylinder block lower than said portion are not plated. The material used for the sleeveless cylinder block is not restricted, although an aluminum alloy which is lightweight and relatively durable is preferably used in many cases. Other alloys can be used, and various formulae to produce aluminum alloys or other alloys can be adapted. Researches on new plastic material are under way, and some plastic material is expected to replace metal alloys in the future. The plating coating should have sufficient lubricity, frictional properties, hardness and so forth, and from this point of view, a nickel-based or chrome-based plating coating, especially a nickel-based plating coating containing a dispersed silicon carbide (preferably 0.2%–10% by weight) with phosphorus (preferably 0.5%–1% by weight), is preferred. The thickness of the plating coating can vary, but may be 10–200 µm after honing treatment. The number of cylinders is not critical, normally between 1 and 12, and the coolant can be either water or air. The capacity of the combustion cylinder is not restricted. The sleeveless cylinder block of the present invention can be any type of internal combustion engine for any purpose in which a piston slides upon the inside surface of the sleeveless cylinder. Despite the fact that the sleeveless cylinder block of the present invention can be adapted for any cylinder in which a piston slides, an automobile engine cylinder block and a motorcycle engine cylinder block can typify the sleeveless cylinder block of the present invention. The former has a cylinder skirt integrally formed at the bottom of the cylinder, and usually has an upper crankshaft bearing portion further integrally formed at the bottom of the cylinder, which upper crankshaft bearing portions projects inward with respect to the inside surface of the cylinder. The latter usually have neither a cylinder skirt nor crankshaft bearing portion integrated with the cylinder, which is assembled afterward.

The sleeveless cylinder block of the present invention has the unplated portion at the bottom of the cylinder, which has a width sufficient to seal plating liquid with a sealing jig contacting the portion during plating treatment. The width can vary depending on the kind of a sealing jig, whether or not a cylinder skirt and a crankshaft bearing portion are integrated, the flow speed of plating liquid and the like, and may normally be approximately 2–20 mm, preferably 5–10 mm. The unplated portion on the inside surface can be constructed by extending the inside surface downward so as to form a transitional wall between the cylinder and the cylinder skirt, or by extending the inside surface upward so as to provide said unplated marginal portion at the bottom end of the cylinder. In the case of the former, the area between the cylinder and the cylinder skirt can be strengthened, thereby reducing noise during engine operation, and in the case of the latter, the cylinder block can easily be constructed without affecting other structures such as the structure of crankshaft bearing portions. If the unplated marginal portion is provided at the bottom of the cylinder by extending downward, and a crankshaft bearing portion is integrated with the cylinder block, the inward projecting part of the crankshaft bearing portion (normally 5–10 mm), which contacts the bottom of the cylinder, is reduced along the inside surface of the cylinder to a point deeply enough to place a sealing jig at the bottom of the cylinder. The total of both the width of the unplated marginal portion of the cylinder and the length of the reduced part corresponds to the width of a sealing jig. The length of the reduced part may normally be 5–15 mm. If the cylinder is extended upward, the projecting part is not necessarily reduced.

Any plating system in which plating liquid flows exclusively inside the cylinder and is sealed with a sealing jig can be adapted for the sleeveless cylinder block of the present invention. The desired plating system adapted to this invention will be described later.

An embodiment of the sleeveless cylinder block of this invention will be described below with reference to the figures.

EXAMPLE 1

Major Features of Cylinder Block

Figure 2:
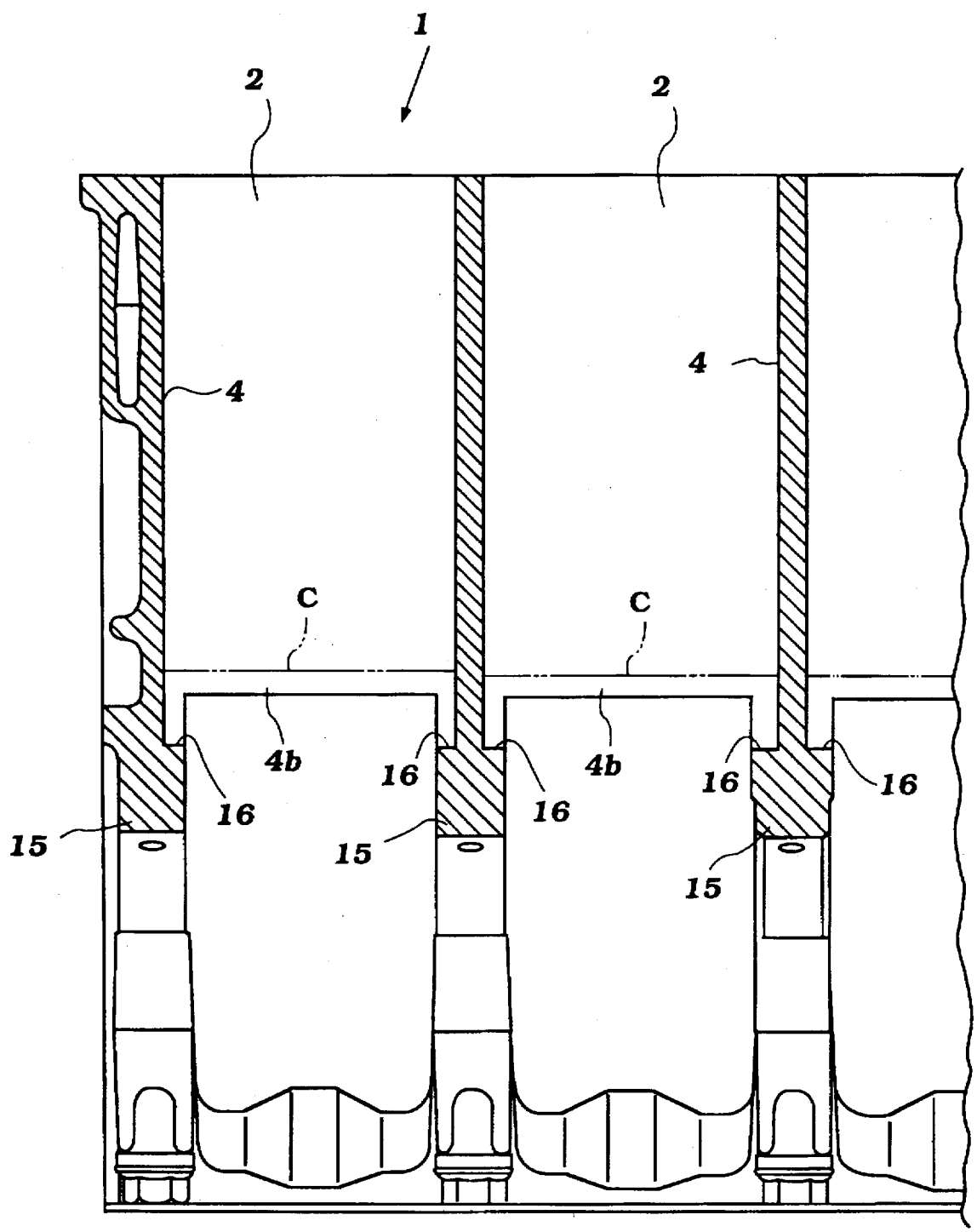
FIG. 2 is a vertical cross-sectional schematic view (partial) parallel to a crankshaft (not shown) illustrating the sleeveless cylinder block shown in FIG. 1.
Figure 3:
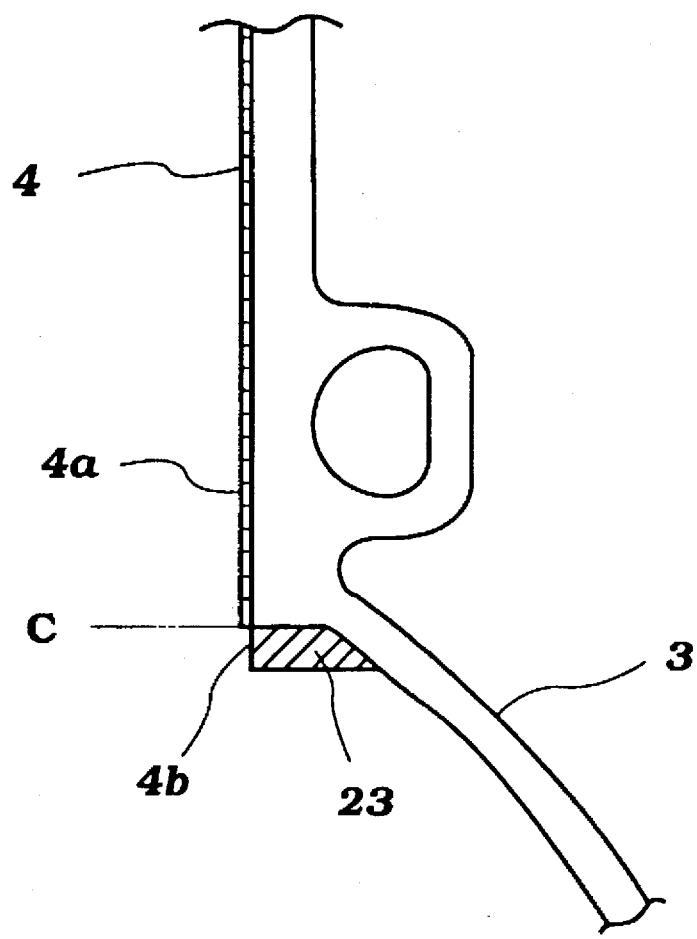
FIG. 3 is an illustrative enlargement of the area formed between the bottom of the cylinder and the cylinder skirt in the sleeveless cylinder block shown in FIG. 1.

FIG. 1 is a vertical cross-sectional schematic view perpendicular to a crankshaft (not shown) illustrating one embodiment of a sleeveless cylinder block of the present invention (an automobile engine cylinder block). FIG. 2 is a vertical cross-sectional schematic view (partial) parallel to a crankshaft (not shown) illustrating the sleeveless cylinder block shown in FIG. 1. In these Figures, a cylinder skirt area 3 of the cylinder block 1 is formed as a unit which is contiguous with the lower end of the cylinder 2 in the cylinder block 1. An upper crankshaft bearing portion 15 is integrated with the cylinder block 1 at the bottom of the cylinder 2 in such a way that the bearing portion 15 bridges the cylinders 2 aligned in a row and that the thickness of the portion 15 is thicker than that of the partition wall between the cylinders 2 aligned in a row. The bearing portion 15 is not imperative in the present invention as described earlier. A piston slides upon the plated inside surface 4 in the cylinder 2. The inside surface 4 for each cylinder 2 is thoroughly plated from the top to the position labeled C in the Figures, and the inside surface 4 extends downward to provide an unplated marginal portion 4b. The plating coating ends clearly at position C, and any other pad of the cylinder block is not plated. The unplated marginal portion can be provided by extending the cylinder upward as described earlier. The area of the bearing portion 15 connecting the inside surface 4 is reduced along the inside surface 4 to provide a step 16. That is, the step 16 is formed inside the cylinder block 1 at the bottom of the cylinders 2 and just above the crankshaft upper bearings. The step 16 projects circularly from the inside surface 4 of each cylinder 2 toward the cylindrical axis. In this example, the width of 4b is 6 mm, and the length and the depth of the step 16 are 12 mm and 8 mm, respectively, meaning that the width of a sealing jig is approximately 18 mm. The bearing portion 15 is usually mechanically ground, but that mechanical treatment does not affect the quality of the plating coating since no plating coating is formed at the bottom of the cylinder or on the bearing portion 15 or any other place. FIG. 3 is an illustrative enlargement of the area formed between the bottom of the cylinder and the cylinder skid in the sleeveless cylinder block shown in FIG. 1. In this Figure, a nickel or chrome plating coating 4a is deposited on the inside surface 4 of the cylinder all the way down to position C, but no plating coating is deposited on the pad of inside cylinder surface 4b that extends below position C. By extending the inside surface 4 of the cylinder 2 below position C, it becomes possible, as shown in FIG. 3, to form a thick-walled area 23 where the bottom of the cylinder 2 joins the cylinder skid area 3. This thickened wall 23 reinforces the strength of the transitional pad between the cylinder and the cylinder skit, thereby decreasing noise during engine operation.

EXAMPLE 2

Other Features of Cylinder Block

Figure 4:
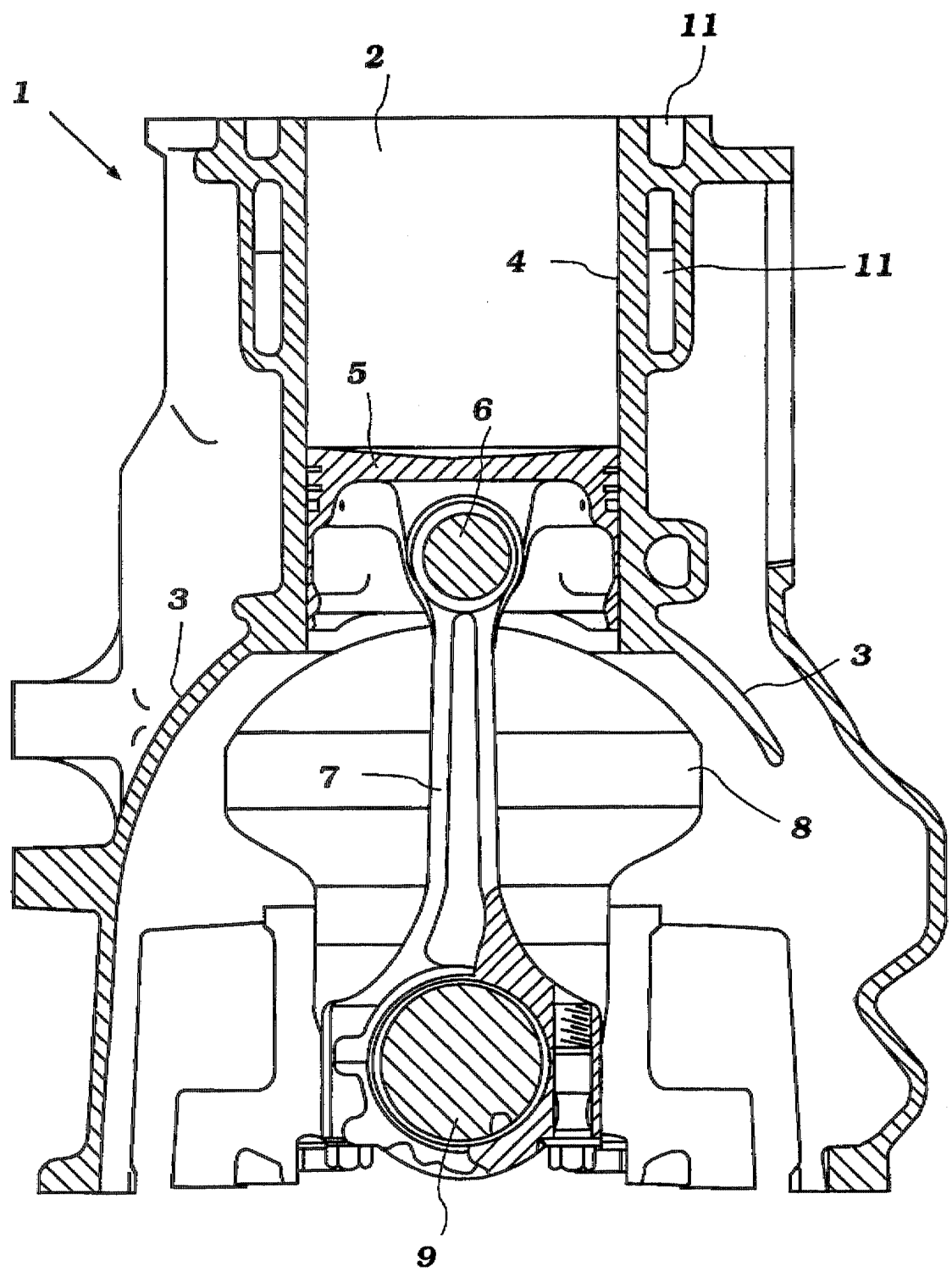
FIG. 4 is a vertical cross-sectional schematic view perpendicular to a crankshaft (not shown) illustrating a sleeveless cylinder block similar to that shown in FIG. 1, with a piston position at its lower dead point.

FIG. 4 is a vertical cross-sectional schematic view perpendicular to a crankshaft (not shown) illustrating a sleeveless cylinder block similar to that shown in FIG. 1, with a piston position at its lower dead point. In this Figure, a piston positioned at its lower dead point in a sleeveless cylinder block of this invention is shown. The cylinder skirt area 3 of the cylinder block is formed as a unit which is contiguous with the lower end of the cylinder 2 in the cylinder block 1. Piston 5 slides upon the inside surface 4 in the cylinder 2. The piston 5 is linked to a connecting rod 7 by means of a piston pin 6; said rod 7 in turn moves around the surface of a crank arm (not shown) in a manner such that the up-down oscillation of the piston causes the crankshaft to rotate. In this embodiment, the unplated marginal portion is located below the lower dead point position of the lower end of piston 5, and thus the sliding of piston 5 on the inside surface of the cylinder can remain excellent in lubricity and frictional properties. In addition, by extending the inside surface of the cylinder 4 below the dead point position of the lower end of the piston, (i.e., position C shown in FIG. 3 is the dead point position), a thick-walled area 23 where the bottom of the cylinder 2 joins the cylinder skirt area 3 can efficiently contribute to a decrease in noise during engine operation.

Figure 5:
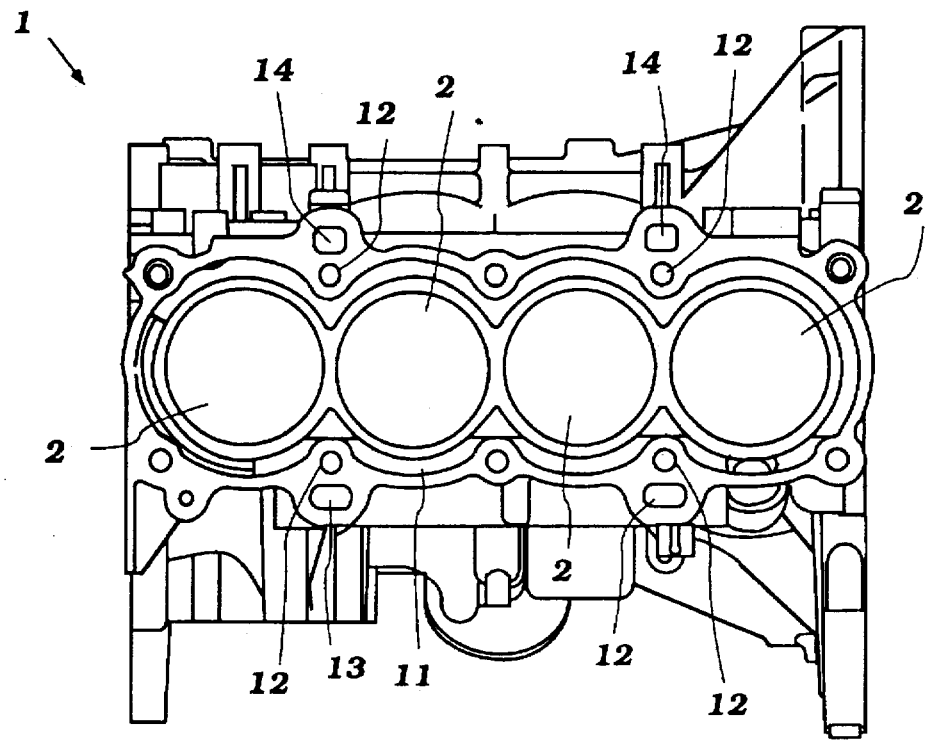
FIG. 5 is a top overall view of an embodiment (four cylinders) of the sleeveless cylinder block shown in FIG. 4.
Figure 6:
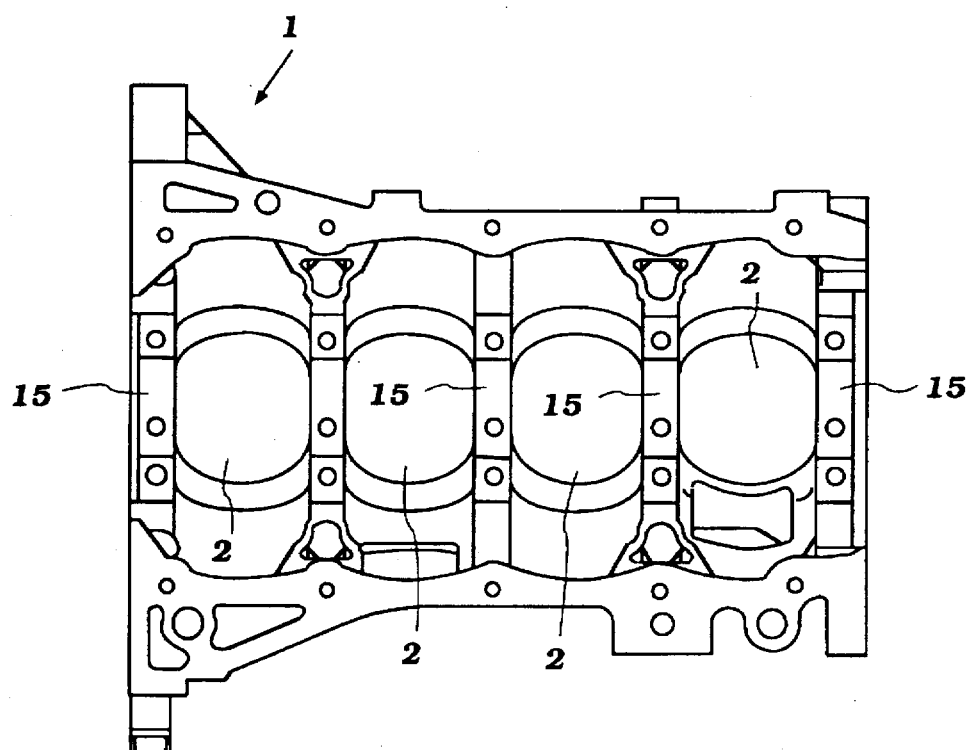
FIG. 6 is a perspective overall view of an embodiment (four cylinders) of the sleeveless cylinder block shown in FIG. 4.

FIG. 5 is a top overall view of an embodiment (four cylinders) of the sleeveless cylinder block shown in FIG. 4. FIG. 6 is a perspective overall view of the embodiment of the sleeveless cylinder block shown in FIG. 4. In these Figures, the entire cylinder block (an aluminum alloy integral unit in this embodiment) is shown. Four cylinders 2 are aligned in a row in the cylinder block 1. As shown in FIG. 5, there is a continuous water jacket 11 with openings in the top surface of the cylinder block I around the cylinders 2. Additional openings are shown for left and right bolt holes 12 between the first and second and third and fourth cylinders, oil drop holes 13 that link the valve chamber formed by the cylinder head and head cover with crank case, and ventilation holes 14. Also, as shown in FIG. 6, upper bearing portions 15 for the crankshaft are located below the partition walls between the cylinders 2 in the cylinder block 1, and are thicker than the partition walls between the cylinders; these bearing portions 15 are integrally formed into a bridge-like shape in the direction perpendicular to a crankshaft in the cylinder block 1.

Figure 7:
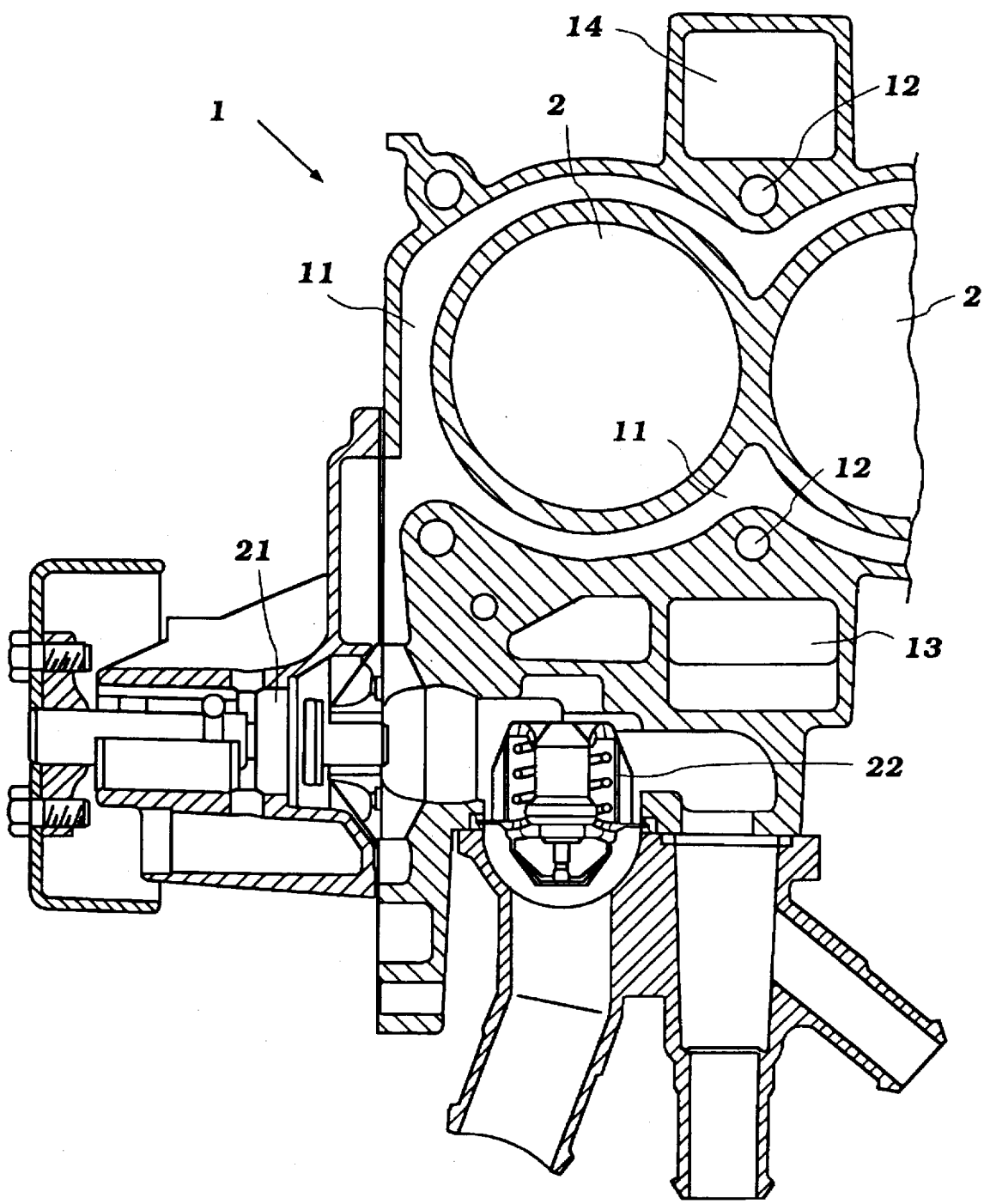
FIG. 7 is a horizontal cross-sectional view (partial) of an embodiment of the sleeveless cylinder block shown in FIG. 4, which indicates the location of a water pump and thermostat.

FIG. 7 is a horizontal cross-sectional view (partial) of an embodiment of the sleeveless cylinder block shown in FIG. 4, which indicates the location of a water pump and thermostat. A water pump 21 and thermostat 22 control the flow of coolant water for the water jacket 11 in the cylinder block 1, and their position relative to the cylinder block 1 is as shown in the Figure.

In a sleeveless cylinder block having tightly adjoining cylinders with but thin walls between them, there is little room for heat to escape from the wall areas between the cylinders. However, the heat dissipation from the wall areas between the cylinders, and the cooling properties are improved in this embodiment by forming the oil drop holes 12 and the ventilation holes 13 just outside the walls between the cylinders. Also, since the sleeveless cylinder block of this embodiment can provide good heat dissipation, as shown in FIG. 1, the water jacket 11 can be smaller, and the contact surface area between the piston 5 and cylinder 2 can be decreased. Further, the overall strength of the cylinder block is improved because these oil drop holes 12 and ventilation holes 13 create passages in the vertical direction, thereby further abating the potential for noise.

The above is an explanation of an embodiment of the sleeveless cylinder block of this invention, but the invention is not confined to this specific structure. For example, it goes without saying that the number of cylinders in the block or the structures of the water jacket can be subjected to appropriate design modifications. In the present invention, any plating system in which plating liquid flows exclusively inside the cylinder to be plated and is sealed with a sealing jig can be employed to obtain the sleeveless cylinder block of the present invention. However, the structure of the cylinder block is suitable for a high speed plating system described below, since the sealing jig can be securely disposed on the unplated marginal portion of the cylinder.

EXAMPLE 3

Plating Process of Sleeveless Cylinder Block

Figure 8:
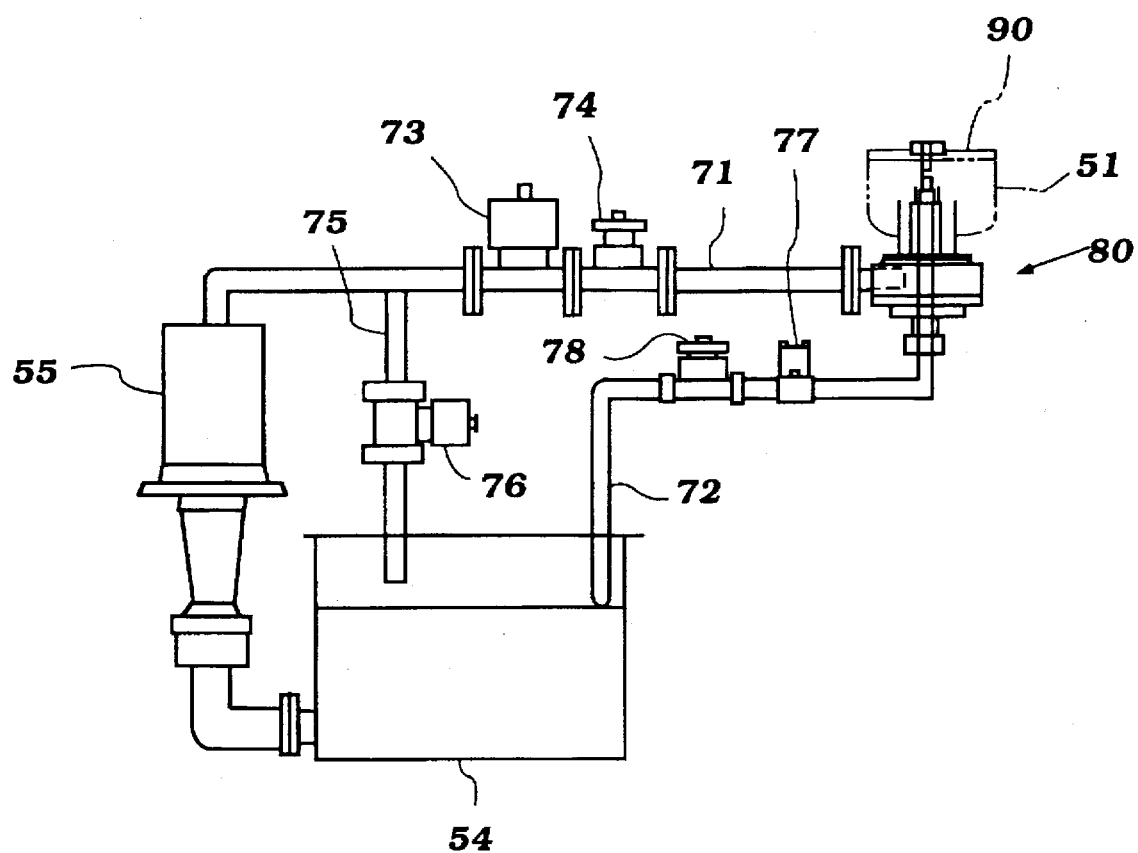
FIG. 8 is a schematic view illustrating a piping system of a plating system adapted to plate the inside surface of the sleeveless cylinder block of the present invention, in which the cylinder block is placed upside down.

FIG. 8 is a schematic view illustrating a piping system of a plating system adapted to plate the inside surface of the sleeveless cylinder block of the present invention, in which the cylinder block is placed upside down. As depicted in the Figure, a reservoir tank 54 storing a nickel sulfamate or a nickel sulfate, and a workstation 80 are connected to each other via a liquid feed pipe 71 and a treating liquid recovery pipe 72. A pump 55 is placed in the liquid feed pipe 71, and supplies plating liquid to the liquid feed pipe 71 from the tank 54. The plating liquid is then fed into the workstation 80 and the inside surface of a cylinder block 51, and discharged from the workstation 80 into the treating liquid recovery pipe 72 leading to the tank 54. Further, a by-pass pipe 75 is placed right after the pump 55 downstream, and the by-pass pipe 75 leads to the tank 54. In the workstation 80, a sealing jig is affixed to a supporting plate 90. The liquid feed pipe 71 and the by-pass pipe 75 are provided with automatic valves 73 and 76, respectively. The liquid feed pipe 71 is also provided with a manual valve 74. The treating recovery pipe 72 is provided with a manual valve 78 and a flow rate sensor 77 downstream.

Figure 9:
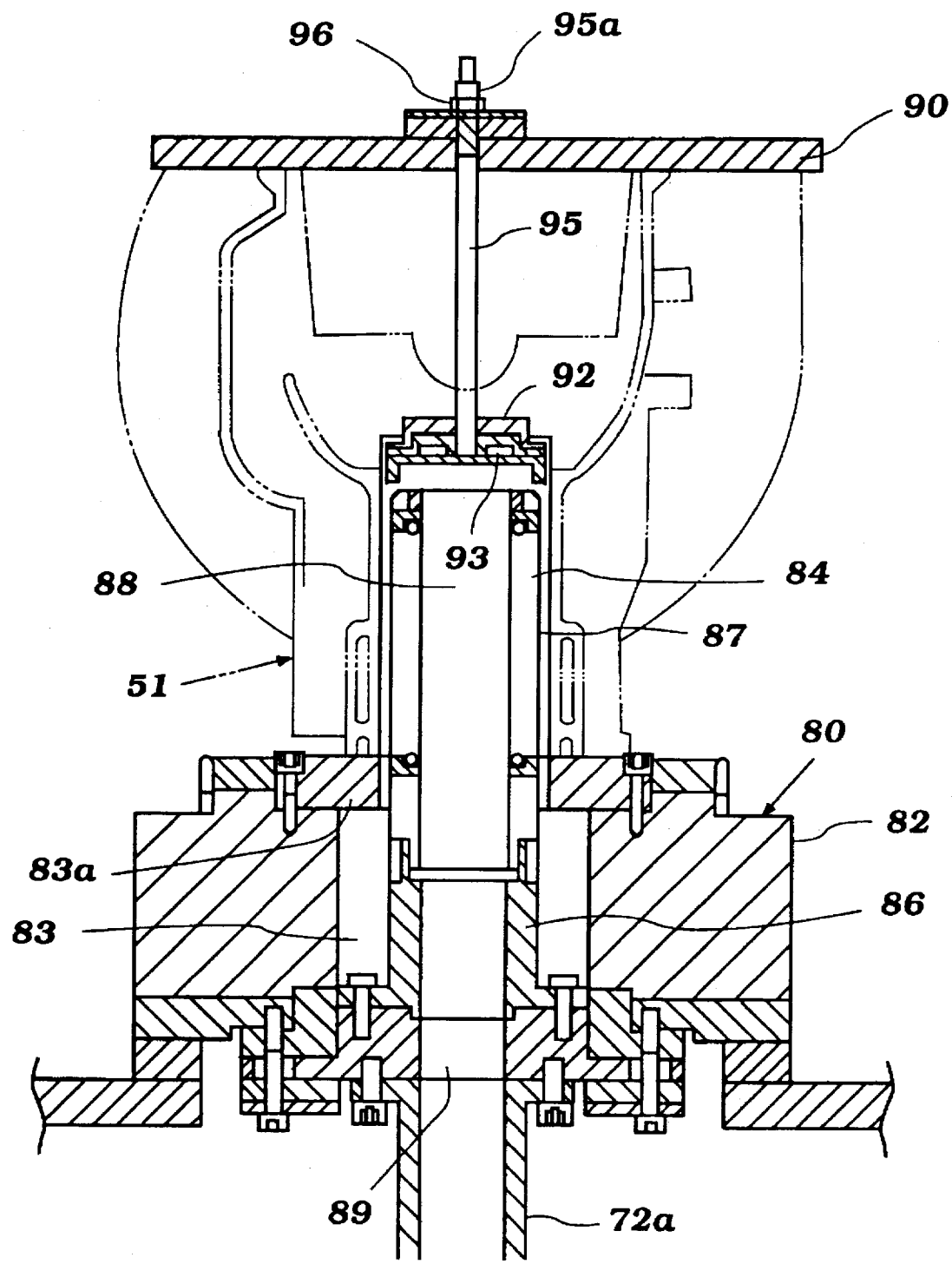
FIG. 9 is a vertical cross-sectional view perpendicular to a crankshaft (not shown) showing one embodiment of a workstation adapted for a plating system shown in FIG. 8.

FIG. 9 is a vertical cross-sectional view perpendicular to a crankshaft (not shown) showing one embodiment of a workstation adapted for a plating system shown in FIG. 8. A cylinder block 51 is placed in a workstation 80, in which the inside surface of the cylinder block 51 will be plated. The cylinder block 51 is fixed on a supporting base 82, and the opening of the cylinder block 51 is sealed with a sealing jig (a pressing plate 93 and a fixing base 92). The cylinder block 51 is electrically insulated from the supporting portion 82 using a material used as both an insulator and a seal portion placed between the cylinder block 51 and the supporting base 82. The sealing jig is made from conductive material, and functions as a connection terminal when electrified. The supporting base 82 forms a treating liquid feed path 83 in the horizontal direction, and is provided with an opening 83a which communicates to the treating liquid feed path 83 at the location where the top edge opening (on the combustion side) of the cylinder block 51 is placed. When the cylinder block 51 is fixed on the supporting base 82, the location of the top edge opening of the cylinder block 51 matches that of the opening 83a, whereby both the peripheries of the openings are fastened to each other. The workstation 80 is also provided with an electrode 84 at the location where the inside surface of the cylinder will be placed. The electrode 84 is cylindrically formed, and connected to a holder 86 which is formed on the lower wall of the workstation 80, wherein the electrode 84 protrudes from the treating liquid feed path 83 and the opening 83a upward. The holder 86 is made from a conductive material, and also functions as a connection terminal. When the cylinder block 51 is fixed on the supporting base 82, the electrode 84 is inserted into the inside of the cylinder, and the upper edge of the electrode 84 reaches a point near the bottom of the cylinder (the upper opening in the Figure). Accordingly, in the inside surface of the cylinder, an outer cylindrical opening passage 87 and an inner cylindrical opening passage 88 which communicate with each other are formed, and the treating liquid feed path 83 leads to the passage 88. Through the holder 86 and the passage 88 of the inside surface of the cylinder, a treating liquid discharge path 89 is formed. The treating liquid discharge path 89 is connected to the treating liquid recovery pipe 72 via a connection pipe 72a as shown above. The sealing jig is affixed via a rod 95 to the supporting plate 90 disposed over the cylinder skirt, and the position of the sealing jig is adjusted by a screw 95a and a nut 96 so that the sealing jig (a pressing plate 93 and a fixing base 92) can fit inside the inside surface of the cylinder at the bottom thereof.

Figure 10:
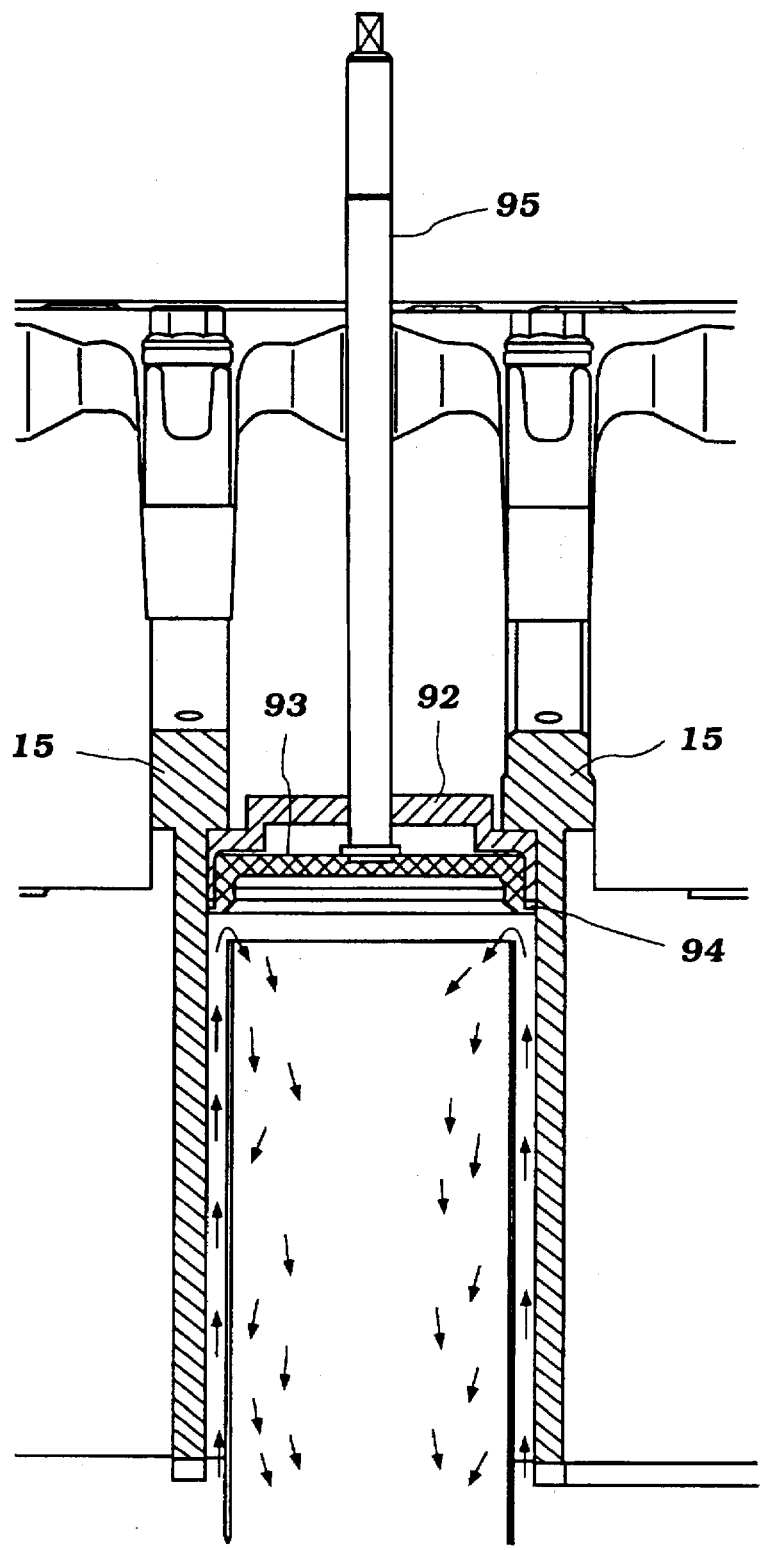
FIG. 10 is a vertical cross-sectional view parallel to a crankshaft (not shown) illustrating the position of a sealing jig placed inside the cylinder.

FIG. 10 is a vertical cross-sectional view parallel to a crankshaft (not shown) illustrating the position of a sealing jig placed inside the cylinder. In this Figure, a sealing jig (92 and 93) that is inserted into the cylinder from the opening in the top of the cylinder block (the lower opening in the Figure) is automatically positioned by indexing on the step 16 formed above the upper crankshaft bearing portions 15. The sealing jig (92 and 93) completely seals off the bottom opening of the cylinder with an O-ring 94 which is compressed by the fixing base 92 and the pressing plate 93 when the screw of the top of the rod 95 is tightened, whereby the upper part of the inside wall of the cylinder that lies above the seal is allowed to be plated by the plating liquid that flows into the top opening of the cylinder (the bottom opening in the Figure) at a flow speed of approximately 1–6 m/sec with respect to the surface of the inside surface. The sealing area of the inside cylinder wall in contact with the sealing jig (92 and 93) corresponds to the area 4b that lies below position C shown in FIGS. 2 and 3. Accordingly, the 4b area is not plated.

As described above, the cylinder block in this embodiment does not require that the sealing jig (92 and 93) be inserted from the bottom of the cylinder block 1 into cylinder during the plating process, thereby eliminating any need for cutting away material between the cylinder walls and reducing the thickness at the upper crankshaft bearing portions 15 in order to accommodate the sealing jig. Further, the step areas 16 at the bottom of the cylinder allow the automatic positioning of the seal at the position corresponding to the bottom of the piston inside the cylinder.

Figure 11:
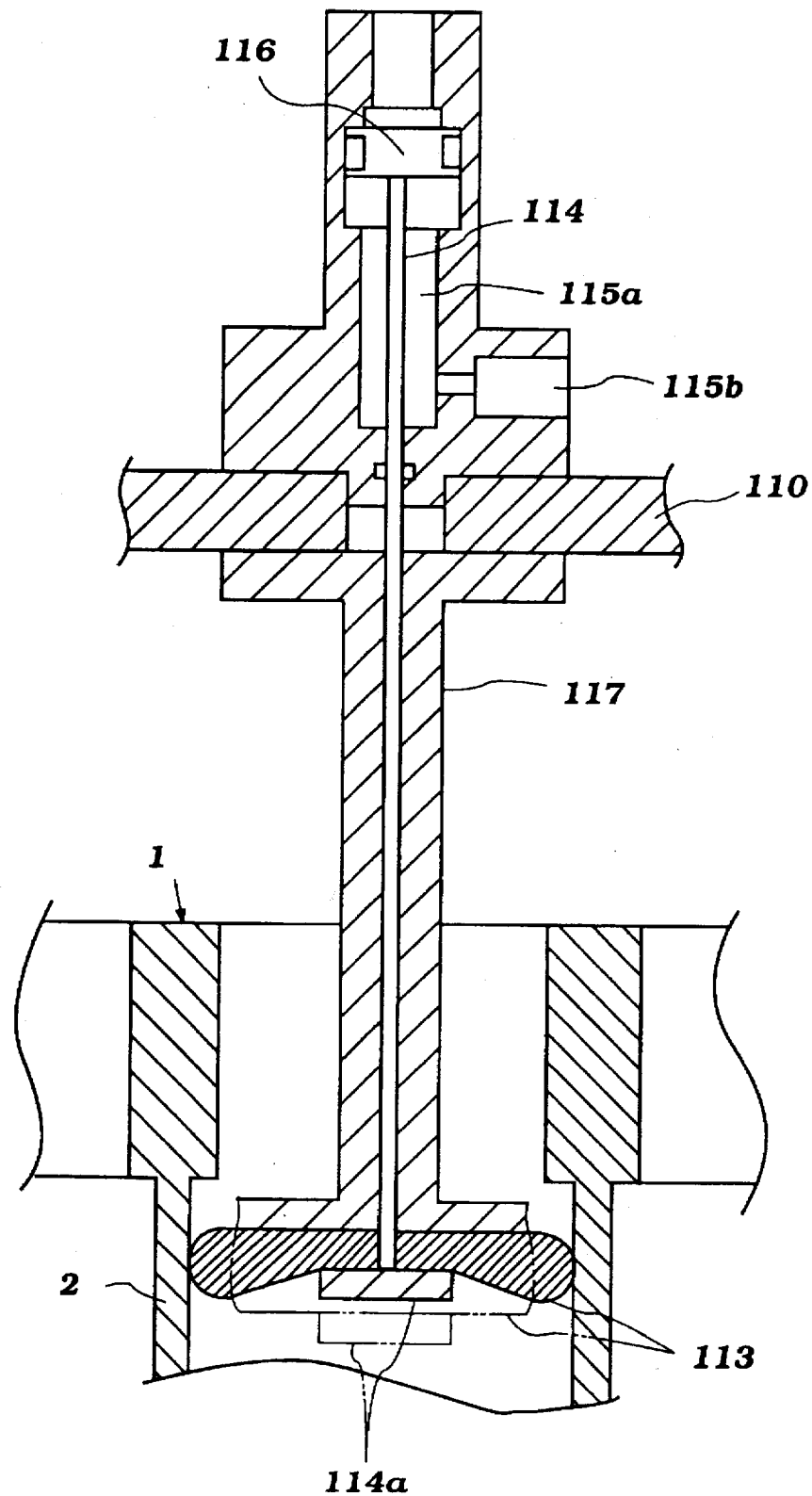
FIG. 11 is a vertical enlarged cross-sectional view parallel to a crankshaft (not shown) illustrating another embodiment of a sealing jig positioned inside the cylinder.

FIG. 11 is a vertical enlarged cross-sectional view parallel to a crankshaft (not shown) illustrating another embodiment of a sealing jig positioned inside the cylinder. In this Figure, a sealing jig is composed of an elastic material 113 and a pressing plate 114a which compresses the elastic material 113 via a tension rod 114 connecting a piston 116 which is operated by air pressure loaded through a port 115b and an air chamber 115a. When the elastic material 113 is compressed, the material is extended in the horizontal direction (perpendicular to the compression direction) so as to seal off the bottom of the cylinder, the double-dash lines, numbered 113 and 114a, and the solid lines, numbered 113 and 114a, in FIG. 11 show the structures prior to and upon compression, respectively), and a solid line shows. In this embodiment, although a step corresponding to the step 16 in FIG. 10 is shown in FIG. 11, the step is not necessary for positioning the sealing jig and sufficiently sealing off the bottom of the cylinder. The positioning of the sealing jig can be conducted completely by adjustment of the length of a rod 117 affixed to a supporting plate 110. In addition, since the width of the elastic material 113 prior to compression is smaller than the width between the upper bearing portions, the sealing jig can be inserted from the bottom of the cylinder. After plating the inside surface of the cylinder, the plating coating is subjected to honing treatment, and other parts are subjected to mechanical grinding as necessary.

The plating coating deposited on the inner cylinder surface of the cylinder block of the present invention has desirably been formed in connection with an improved plating system, the details of which are set forth in a U.S. patent application entitled "Plating Liquid, Plating Method and Plating Cylinder," Ser. No. 08/299,838, filed on Sep. 1, 1994 (claiming priority from Japanese Patent Application No. 218753, filed Sep. 2, 1993), which is hereby incorporated herein by reference. Further, the plating coating deposited on the inner cylinder surface of the cylinder block of the present invention may also be a non-homogenous composite plating coating formed by an improved plating system, the details of which are set forth in U.S. patent applications entitled "Non-homogenous Composite Plating Coating," Ser. No. 08/391,504, filed Feb. 21, 1995, and "Plating Method and Plating System for Non-homogenous Composite Plating Coating," Ser. No. 08/391,505, filed Feb. 21, 1995 (both claiming priority from Japanese Patent Application No. 22640, filed Feb. 21, 1994), which are hereby incorporated herein by reference.

It will be understood by those of skill in the art that numerous variations and modifications can be made without departing from the spirit of the present invention. Therefore, it should be clearly understood that the forms of the present invention are illustrative only and are not intended to limit the scope of the present invention.

What we claim:

1. A sleeveless cylinder block formed from a material selected from the group of aluminum and aluminum alloys and having at least one cylinder bore, the inside surface of said cylinder bore swept by a piston through its stroke being plated by electroplating, wherein a marginal portion from the bottom end of the inside surface of said cylinder bore on the side of a cylinder skirt and the remaining part of the cylinder block lower than the portion of the cylinder bore swept by the piston are not plated, said portion having a width of 2–20 mm for permitting the formation of a liquid seal of said portion during the plating process.

2. The sleeveless cylinder block according to claim 1 further comprising upper crankshaft bearing portions integrally formed with the cylinder at the bottom of the cylinder, said upper crankshaft bearing portions projecting inward with respect to the inside surface of the cylinder.

3. The sleeveless cylinder block according to claim 1, wherein said plating on the inside surface of the cylinder is a nickel-based composite plating containing a dispersed silicon carbide and phosphorus.

4. The sleeveless cylinder block according to claim 1, wherein the cylinder block is made of an aluminum alloy.

5. The sleeveless cylinder block according to claim 2, wherein the cylinder block is an automobile engine cylinder block.

6. The sleeveless cylinder block according to claim 1, wherein the cylinder block is a motorcycle engine cylinder block.

* * * * *